US010915584B2

(12) United States Patent
Chang et al.

(10) Patent No.: US 10,915,584 B2
(45) Date of Patent: Feb. 9, 2021

(54) EVENT-RELATED DOCUMENT GENERATION

(71) Applicant: Dropbox, Inc., San Francisco, CA (US)

(72) Inventors: Tsung-Hsiang Chang, San Bruno, CA (US); Christina Cacioppo, San Francisco, CA (US); Ryhan Hassan, San Francisco, CA (US); Phillip Cohen, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 764 days.

(21) Appl. No.: 14/861,100

(22) Filed: Sep. 22, 2015

(65) Prior Publication Data
US 2017/0083871 A1 Mar. 23, 2017

(51) Int. Cl.
*G06Q 10/10* (2012.01)
*H04L 29/08* (2006.01)
*G06F 16/93* (2019.01)

(52) U.S. Cl.
CPC ......... *G06F 16/93* (2019.01); *G06Q 10/1095* (2013.01); *H04L 67/02* (2013.01)

(58) Field of Classification Search
CPC ........... G06Q 10/1095; G06Q 10/1093; G06Q 10/103; G06Q 10/101; H04L 67/02; G06F 17/211; G05B 2219/36271; H04N 21/252; G06T 2219/024; Y10S 707/951; Y10S 715/963; Y10S 425/235
See application file for complete search history.

(56) References Cited

U.S. PATENT DOCUMENTS

| | | | | |
|---|---|---|---|---|
| 6,854,016 B1* | 2/2005 | Kraenzel | ................ | G06Q 10/06 709/229 |
| 7,082,430 B1* | 7/2006 | Danielsen | ............. | G06F 16/252 |
| 7,107,312 B2* | 9/2006 | Hackbarth | ........... | G06Q 10/107 709/204 |
| 7,171,448 B1* | 1/2007 | Danielsen | .............. | G06Q 10/10 709/205 |
| 7,299,257 B2* | 11/2007 | Boyer | .................. | G06Q 10/107 709/204 |
| 7,679,518 B1* | 3/2010 | Pabla | ................... | G06Q 10/109 340/309.16 |
| 7,853,471 B2* | 12/2010 | Zurko | ................ | G06Q 10/1095 705/7.19 |

(Continued)

FOREIGN PATENT DOCUMENTS

WO WO-2014076578 A2 * 5/2014 ......... H04L 65/1069

OTHER PUBLICATIONS

AvePoint, Inc., "Introducing Meetings for Microsoft SharePoint 2013," Mar. 11, 2013 [retrieved online at http://www.avepoint.com/community/team-blog/introducing-meetings-for-microsoft-sharepoint-2013/ on Jun. 30, 2015].

(Continued)

*Primary Examiner* — Tyler W Knox
(74) *Attorney, Agent, or Firm* — DLA Piper LLP (US)

(57) ABSTRACT

A computer-implemented method, system, and non-transitory computer-readable medium may provide event attendees of a network-accessible calendar with a way to generate collaborative notes for a meeting related to an event. In some embodiments, a calendar entry in a network-accessible calendar may be identified. The calendar entry may correspond to an event and may identify the event attendees. A collaborative document that capable of receiving modifications to the event from the event attendees may be created. The event attendees may further be provided access to the collaborative document.

25 Claims, 10 Drawing Sheets

(56) References Cited

U.S. PATENT DOCUMENTS

| | | | | |
|---|---|---|---|---|
| 7,904,323 B2* | 3/2011 | Wynn | G06Q 10/103 | 715/751 |
| 7,974,871 B2* | 7/2011 | Oral | G06Q 10/06311 | 705/7.13 |
| 8,036,140 B2* | 10/2011 | Rao | H04L 12/1818 | 370/254 |
| 8,281,248 B2* | 10/2012 | Kurpick | G06Q 10/00 | 715/753 |
| 8,341,532 B2* | 12/2012 | Ryan | G06Q 10/10 | 715/751 |
| 8,676,792 B1* | 3/2014 | Scatamacchia | G06Q 10/10 | 707/724 |
| 8,881,244 B2* | 11/2014 | Bhogal | G06F 21/6218 | 726/4 |
| 8,887,064 B1* | 11/2014 | Oh | G06Q 10/109 | 715/751 |
| 9,195,965 B2* | 11/2015 | Sitrick | G06Q 10/101 | |
| 9,246,860 B2* | 1/2016 | Sargent | H04L 51/12 | |
| 9,390,398 B2* | 7/2016 | Williams | G07C 13/00 | |
| 9,400,833 B2* | 7/2016 | Thapliyal | G06F 16/285 | |
| 9,692,850 B2* | 6/2017 | Offenhartz | H04L 67/306 | |
| 9,729,589 B2* | 8/2017 | Offenhartz | H04L 65/403 | |
| 9,779,162 B1* | 10/2017 | Jackson | G06Q 10/1093 | |
| 9,854,010 B2* | 12/2017 | Raghavan | H04L 67/18 | |
| 9,880,992 B2* | 1/2018 | Hawking | G06F 16/176 | |
| 10,055,698 B2* | 8/2018 | Elenbaas | G06Q 10/06 | |
| 10,394,942 B1* | 8/2019 | Young | G06F 40/169 | |
| 2002/0049749 A1* | 4/2002 | Helgeson | G06F 21/6236 | 709/203 |
| 2002/0143876 A1* | 10/2002 | Boyer | G06Q 10/107 | 709/205 |
| 2003/0135565 A1* | 7/2003 | Estrada | G06Q 10/10 | 709/206 |
| 2004/0261013 A1* | 12/2004 | Wynn | G06Q 10/103 | 715/229 |
| 2005/0034079 A1* | 2/2005 | Gunasekar | G06Q 10/10 | 715/753 |
| 2005/0096926 A1* | 5/2005 | Eaton | G06Q 50/167 | 705/313 |
| 2005/0192822 A1* | 9/2005 | Hartenstein | G06Q 50/01 | 705/319 |
| 2005/0267975 A1* | 12/2005 | Qureshi | H04L 63/105 | 709/229 |
| 2006/0026235 A1* | 2/2006 | Schwarz | G06Q 10/10 | 709/205 |
| 2006/0129445 A1* | 6/2006 | McCallum, Jr. | G06Q 10/1093 | 705/7.18 |
| 2007/0233786 A1* | 10/2007 | Rothley | G06Q 10/06 | 709/204 |
| 2007/0260989 A1* | 11/2007 | Vakil | G06Q 10/109 | 715/748 |
| 2008/0195454 A1* | 8/2008 | Lee | G06Q 10/10 | 705/7.18 |
| 2008/0195705 A1* | 8/2008 | Lee | G06Q 10/109 | 709/204 |
| 2008/0215691 A1* | 9/2008 | Chhatrapati | G06F 16/24547 | 709/206 |
| 2009/0019367 A1* | 1/2009 | Cavagnari | G06F 21/84 | 715/716 |
| 2009/0158200 A1* | 6/2009 | Palahnuk | G06Q 30/0252 | 715/781 |
| 2009/0222741 A1* | 9/2009 | Shaw | G06Q 10/109 | 715/753 |
| 2009/0313074 A1* | 12/2009 | Harpur | G06Q 10/109 | 705/7.18 |
| 2010/0004971 A1* | 1/2010 | Lee | G06Q 10/109 | 705/7.13 |
| 2010/0010864 A1* | 1/2010 | Lee | G06Q 10/109 | 705/7.18 |
| 2010/0235216 A1* | 9/2010 | Hehmeyer | G06Q 10/06316 | 705/7.26 |
| 2010/0332278 A1* | 12/2010 | Stern | G06Q 10/1093 | 705/7.18 |
| 2011/0035687 A1* | 2/2011 | Katis | H04L 12/1827 | 715/758 |
| 2011/0055177 A1* | 3/2011 | Chakra | G06Q 10/109 | 707/695 |
| 2011/0137929 A1* | 6/2011 | Lehmann | G06Q 10/109 | 707/769 |
| 2011/0153629 A1* | 6/2011 | Lehmann | G06Q 30/06 | 707/758 |
| 2011/0154204 A1* | 6/2011 | Narayanaswamy | H04N 7/15 | 715/727 |
| 2012/0084286 A1* | 4/2012 | Hubner | G06Q 10/1093 | 707/737 |
| 2012/0278381 A1* | 11/2012 | Ferlitsch | G06Q 10/109 | 709/203 |
| 2012/0278388 A1* | 11/2012 | Kleinbart | G06Q 10/10 | 709/204 |
| 2013/0067302 A1* | 3/2013 | Chen | G06Q 10/1093 | 715/202 |
| 2013/0117060 A1* | 5/2013 | Henriksen | G06Q 10/1095 | 705/7.21 |
| 2013/0117365 A1* | 5/2013 | Padmanabhan | H04W 4/21 | 709/204 |
| 2013/0117692 A1* | 5/2013 | Padmanabhan | H04N 21/4586 | 715/753 |
| 2013/0125011 A1* | 5/2013 | Hwang | G06Q 10/10 | 715/745 |
| 2013/0218829 A1* | 8/2013 | Martinez | G06Q 10/10 | 707/608 |
| 2014/0036639 A1* | 2/2014 | Boni | G06Q 10/1093 | 368/29 |
| 2014/0040780 A1* | 2/2014 | Artzt | H04L 65/403 | 715/753 |
| 2014/0200944 A1* | 7/2014 | Henriksen | G06Q 10/1095 | 705/7.19 |
| 2014/0298198 A1* | 10/2014 | Kuchibhotla | G06F 40/166 | 715/753 |
| 2015/0058324 A1* | 2/2015 | Kauwe | G06F 16/284 | 707/722 |
| 2015/0074558 A1* | 3/2015 | Haskins | G06F 3/04817 | 715/753 |
| 2015/0100578 A1* | 4/2015 | Rosen | G06F 16/5866 | 707/737 |
| 2015/0112749 A1* | 4/2015 | Erdal | G06F 3/04842 | 705/7.19 |
| 2015/0127405 A1* | 5/2015 | Peeler | G06Q 10/1095 | 705/7.19 |
| 2015/0134737 A1* | 5/2015 | Albrecht | H04L 51/32 | 709/204 |
| 2015/0135300 A1* | 5/2015 | Ford | H04L 63/0281 | 726/11 |
| 2015/0172330 A1* | 6/2015 | Kaplan | H04L 67/325 | 709/206 |
| 2015/0181020 A1* | 6/2015 | Fitzsimmons | H04M 3/42221 | 379/67.1 |
| 2015/0200786 A1* | 7/2015 | Stott | G06Q 10/1093 | 709/204 |
| 2015/0271218 A1* | 9/2015 | Steingrimsson | G06Q 10/101 | 709/204 |
| 2016/0055215 A1* | 2/2016 | Kauwe | G06F 16/284 | 707/722 |
| 2017/0039527 A1* | 2/2017 | Rangan | G06Q 10/1095 | |

OTHER PUBLICATIONS

Cline, Susan, "Google Calendar Collaboration Made Possible with Sharing and Appointment Slots," Aug. 18, 2011 [retrieved online at http://www.techrepublic.com/blog/google-in-the-enterprise/google-calendar-collaboration-made-possible-with-sharing-and-appointment-slots/ on Jun. 30, 2015].

* cited by examiner

EVENT-RELATED DOCUMENT GENERATION

TECHNICAL FIELD

The present technology pertains to enabling productivity management, and more specifically pertains to managing collaborative document generation related to productivity.

BACKGROUND

Content management systems provide users with many features, including the ability to generate and edit documents across a variety of platforms, and the ability to collaboratively generate and edit documents. In many content management systems, users edit content with a component that executes in an Internet browser. In other content management systems, users may edit a local version of the content and later synchronize the local version of the content with a central version of the content that may be located on a network. Content may be created and/or edited locally, for example, by a specific type of native application, such as a word processor or spreadsheet application.

Many content management systems, however, do not effectively integrate into productivity management systems. For example, meeting attendees who wish to discuss or share information regarding an event generally share information through email or telephone calls. Moreover, attendees of an event generally maintain separate record(s) or notes from meetings and often fail to aggregate and/or share the record(s) with other attendees. Tighter integration between content management systems and productivity management systems that leverages available information would be desirable, particularly for users who have access to both types of systems at the same time.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A document editor application incorporated into a content management system may generate collaborative documents related to events. The document editor application may obtain from a productivity management system (e.g., a calendar application or a task management application) information related to an event and may assist to add information related to the event to the collaborative document(s). Some examples of information added to the collaborative document(s) include time(s), date(s), relevant location(s), title(s), agenda(s), summar(ies), description(s), and/or attendees of one or more events. The document editor application may use an Application Programming Interface (API) to connect to the productivity management systems and/or other systems referenced herein.

In various embodiments, the document editor application may generate a collaborative document for the event based on the information obtained from the productivity management system. The document editor application may automatically populate portions of the collaborative document with the information obtained from the productivity management system. For instance, the document editor application may automatically add content to portions of the collaborative document with the information obtained from the productivity management system. The document editor application may share the collaborative document with event attendees. In some embodiments, event attendees can edit the collaborative document. By providing event attendees an editable collaborative document as described, the document editor application may provide event attendees with collaborative tools to record information (e.g., agendas, meeting summaries, impressions and thoughts) related to the event before, during, and after the event.

The document editor application may publish the collaborative document at a specific time, such as at an end time of the event. Publication may include changing the collaborative document to a read-only document, distributing the collaborative document to event attendees, or using other techniques, as described further herein. In some embodiments, the systems and methods herein support a document portal that allows event attendees and/or other users to view and/or edit collaborative documents related to past events. The document portal may prioritize specific collaborative documents in relevant ways by displaying the collaborative documents in an order, arrangement, hierarchy, etc. relevant to users of the document portal. More specifically, as discussed further herein, the document portal may assign each of the collaborative documents a value in an ordered data structure such as a queue, and may rank the collaborative documents according to their respective values. The document editor application may be integrated into a content management system as described further herein.

In one example, a first user may create a calendar entry for an upcoming event in a productivity management system. At the time of the event or chronologically proximate to the occurrence of the event, the document editor application may create a collaborative document related to the event. The collaborative document may be invoked (e.g., instantiated or accessed) by any attendee (e.g., invitee) of the event. When the document is invoked by any of the attendees of the event, the document editor application may retrieve information from the calendar entry regarding the event and include the information within the collaborative document. The collaborative document may be utilized, for example, by the attendee to create an agenda or create notes related to the event to collaborate with other attendees.

In some embodiments, the document editor application may provide a suggestion to an attendee (or to anyone that may attend the event) to invoke the collaborative document. The document editor application may make the suggestion based on the time of the event. For example, the document editor application may retrieve information regarding the time of the event from the productivity management system. As the time of the event draws near (e.g., within a predetermined period of time), the document editor application may provide a suggestion to an attendee to create or access the collaborative document related to the event.

After the collaborative document is invoked by the attendee and the collaborative document is saved, the document editor application may share the collaborative document with other attendees of the event.

BRIEF DESCRIPTION OF THE DRAWINGS

The above-recited and other advantages and features of the disclosure will become apparent by reference to specific embodiments thereof which are illustrated in the appended drawings. Understanding that these drawings show only example embodiments of the disclosure and are not therefore to be considered to be limiting of its scope, the principles herein are described and explained with additional specificity and detail through the use of the accompanying drawings.

DETAILED DESCRIPTION

Various embodiments of the disclosure are discussed in detail below. While some implementations are discussed herein, it should be understood that this is done for illustration purposes only. It will be appreciated that other components and configurations may be used without departing from the spirit and scope of the disclosure.

System Overview

Figure 1:
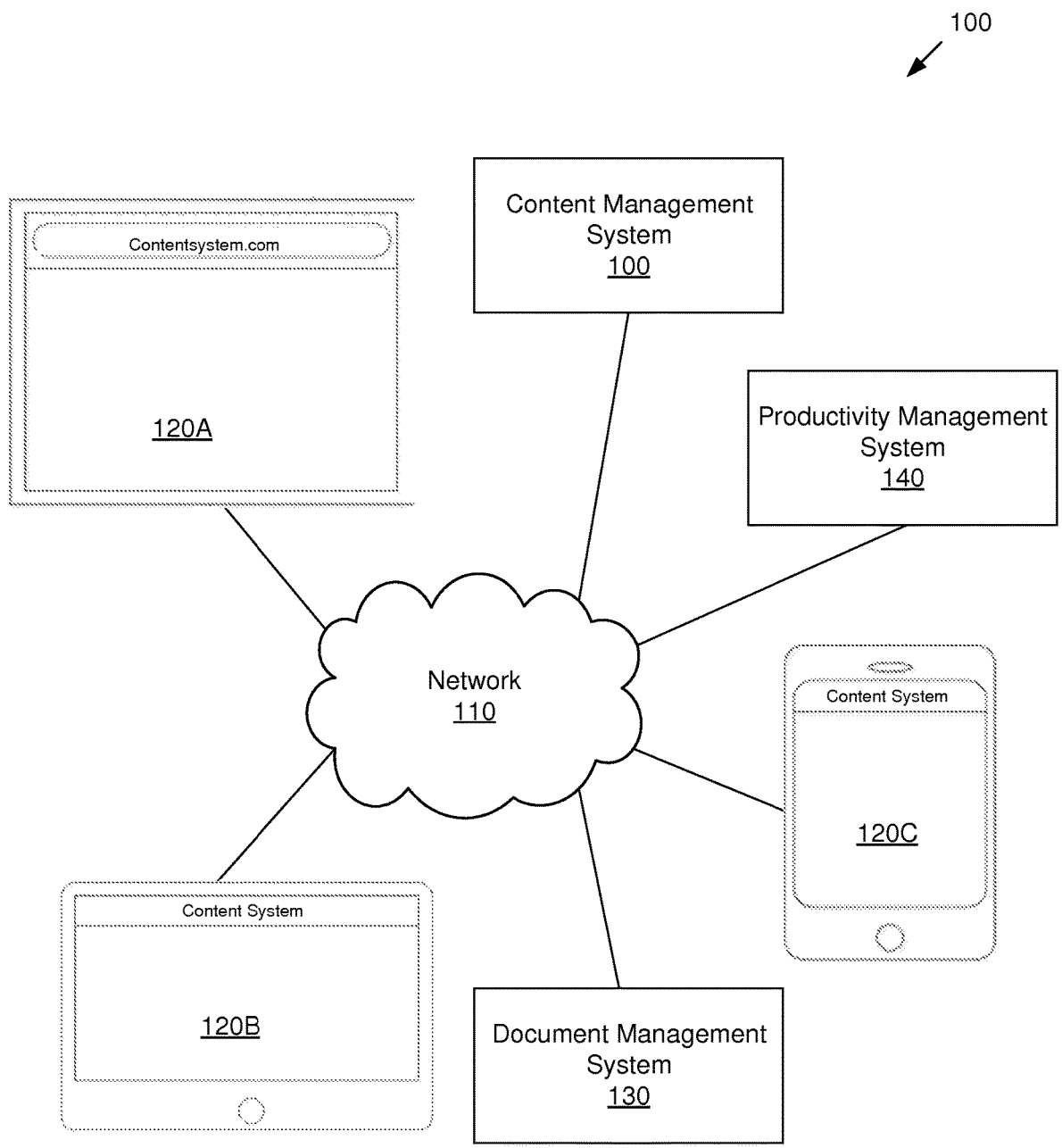
FIG. 1 shows a diagram of a system environment of a content management system and a document management system, according to some embodiments.

FIG. 1 shows a system environment including content management system 100, network 110, client devices 120A, 120B, 120C (collectively or individually "120"), document management system 130, and productivity management system 140.

Network 110 may be any network or combination of networks that allows digital devices to communicate. Network 110 may include the Internet, one or more LANs, and/or one or more WANs. Network 110 may support wireless and/or wired communication.

Content management system 100 provides content sharing. The content management system 100 may allow users to share content with other users of client devices 120. In addition to content sharing, content management system 100 may update shared content responsive to changes and enables users to synchronize changes in content across multiple client devices 120. A user may synchronize content across multiple client devices 120 owned by the user and associated with the user's account, and the user may share content that is synchronized with devices associated with accounts of other users.

Content stored by content management system 100 can include any type of data, such as digital data, documents, media (e.g., images, photos, videos, audio, streaming content), data files and databases, source and object code, recordings, and any other type of data or file. Content stored by content management system 100 may be organized in folders, tables, or in other database structures (e.g., object-oriented, key/value etc.). In one embodiment, content shared by content management system 100 includes content created by using third party applications, e.g., word processors, video and image editors, database management systems, spreadsheet applications, code editors, and so forth, which are independent of content management system 100.

In some embodiments, users may create accounts at content management system 100 and store content thereon by transmitting such content from client device 120 to content management system 100. Content provided by users may be associated with user accounts that may have various privileges. The privileges may include, for example, rights to view the content item, modify the content item, modify user privileges related to the content item, and/or delete the content item.

Document management system 130 provides users of client devices 120 with the ability to create, store, access, and/or share documents. Documents are computer files that a user can create using a document editor, such as a document editor which can be hosted by the document management system 130, or a document editor 270 provided on client device 120.

Document management system 130 may include a system configured to create and/or modify (e.g., edit, annotate, and/or delete) documents. In various embodiments, document management system 130 provides client devices 120 access to one or more document editor(s). In one example, a document editor application may be network-accessible (e.g., accessible to client devices 120 through network 110), linked to email accounts of users of client devices 120, and/or locally run on client devices 120. In some embodiments, document management system 130 may provide APIs that allow documents to be created and/or edited without action by users of client devices 120. For instance, as discussed further herein, document management system 130 may expose APIs to productivity management system 140 that allow document management system 130 to create and/or edit documents. The APIs may be called when creating a collaborative document for an event, as discussed further herein.

Document management system 130 may include a system configured to manage collaborative documents for an event. For example, document management system 130 may obtain from productivity management system 140 information related to an event (e.g., meeting, gathering, party, or occasion). Examples of information that may be obtained include, but are not limited to, time(s), date(s), relevant locations, title(s), agenda(s), summaries, description(s), and/or attendees of events.

Using this information, document management system 130 may create a collaborative document for the event. A "collaborative document," as described herein, may refer to a document that can be view and/or edited by multiple client devices. The collaborative document may be accessible by one or more of client devices 120. In some embodiments, the collaborative document may be edited by multiple client devices at the same time (e.g., in real time).

As discussed further herein, the collaborative document may provide a basis to retain collaborative notes related to the event. For example, the collaborative document may include a draft meeting agenda for the event. The draft meeting agenda can be collaboratively modified by any number of client devices 120. Document management system 130 may enable or perform other actions related to the collaborative document, including publishing and/or sharing the collaborative document to any number of client devices 120, and/or saving the collaborative document to content management system 100 or document management system 130.

In various embodiments, document management system 130 presents an interface (e.g., an interface that presents a list or other organized format) to users that identify documents related to various events. For example, the interface may be a workspace portal that allows any number of users (e.g., through the use of client devices 120) to view and/or edit documents, files, or any other objects. In some embodiments, a workspace portal may include documents, files, or any other objects related to a subject, task, calendar event, or the like. Access to or permissions on the workspace portal (e.g., to view, make changes, delete documents, edit documents, or the like) may be limited to specific users, user accounts, and/or client devices 120. Document management system 130 may organize collaborative documents in the interface related to specific events chronologically, and/or the like. As an example, document management system 130 may assign each of the collaborative documents in the interface a value in an ordered data structure such as a queue, and may rank the collaborative documents according to their respective values (e.g., chronological order).

Productivity management system 140 may include a system configured to provide productivity tools and/or productivity data to users. "Productivity tools," as used herein, may include any computer program configured to assist users with scheduling, task management, and/or contact management. "Productivity data," as used herein, may refer to data provided or used by productivity tools. In various embodiments, productivity management system 140 provides a network-accessible calendar that client devices 120 can access through network 110. The network-accessible calendar may be linked to email accounts and/or document management systems associated with users of client devices 120. For instance, user email accounts and/or document management systems may be linked to any number of network-accessible calendars such as but not limited to the user's Gmail® calendar, Yahoo® calendar, iCloud® calendar, Facebook® calendar, Microsoft® (e.g., Office 365®) calendar, or other calendar. In various embodiments, productivity management system 140 exposes Application Programming Interfaces (APIs) to other systems (e.g., to the document management system 130) so that the other systems can access information related to events.

In the example shown in FIG. 1, content management system 100, client devices 120, document management system 130, and productivity management system 140 are coupled to network 110. It is noted that in various embodiments, however, content management system 100, client devices 120, document management system 130, and/or productivity management system 140 may be coupled to one another by structures other than the network 110. Moreover, in the example shown in FIG. 1, content management system 100, client devices 120, document management system 130, and productivity management system 140 are shown as distinct devices. However, in some embodiments, two or more of content management system 100, client devices 120, document management system 130, and productivity management system 140 may reside on the same digital device and/or on portions of the same digital device.

A module is any hardware, software, or combination of hardware and software. Although each system is one or more modules, it will be appreciated that any module may perform more or less functionality than what is described herein. In some embodiments, a module may operate in conjunction with a processor and memory. In various embodiments, a module may include a processor and/or memory (e.g., a module may include or be an ASIC). Further, each system may have any number of modules, processors, digital devices, or the like.

Client Devices

Figure 2:
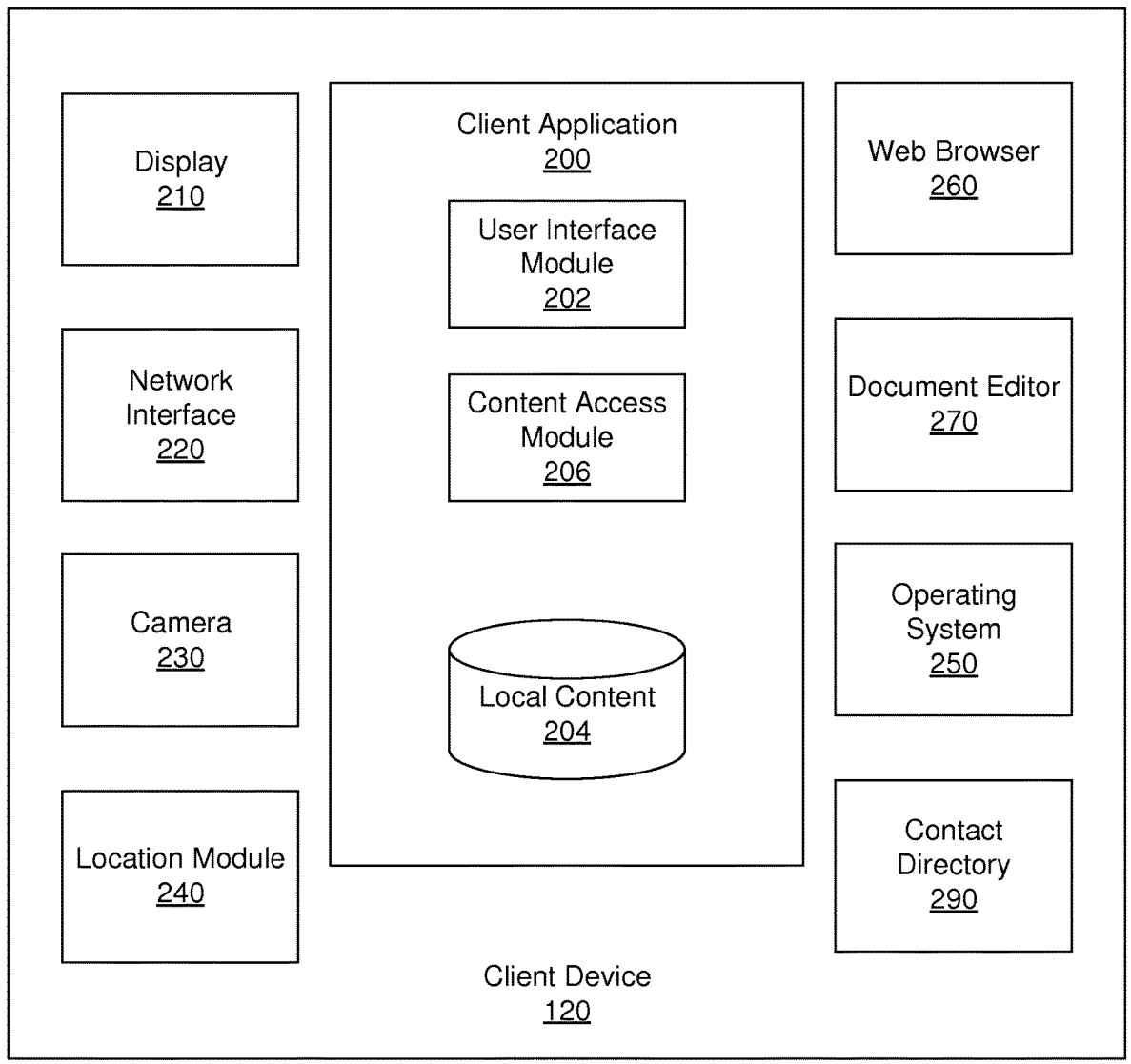
FIG. 2 shows a block diagram of components of a client device, according to some embodiments.

FIG. 2 shows a block diagram of the components of client device 120 according to some embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. Other components of a client device 120 that are not material are not shown, for example, one or more computer processors, local fixed memory (RAM and ROM), as well as optionally removable memory (e.g., SD-card), power sources, and audio-video outputs.

Client devices 120 maintain various types of components and modules for operating the client device and accessing content management system 100. The software modules include operating system 250 and optionally a document editor 270. Document editor 270 is configured for creating, viewing and modifying documents such as text documents, code files, mixed media files (e.g., text and graphics), presentations or the like. Operating system 250 on each device provides a local file management system and executes the various software modules such as client application 200 and document editor 270. A contact directory 290 stores information on the user's contacts, such as name, telephone numbers, company, email addresses, physical address, website URLs, and the like.

Client devices 120 communicate with content management system 100 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In some embodiments, the entities use custom and/or dedicated data communications technologies instead of, or in addition to, the ones described above.

Client devices 120 access content management system 100 and document generation management module 324 in a variety of ways. Client device 120 may access these systems through a native application or software module, such as client application 200. Client device 120 may also access content management system 100 through web browser 260.

As an alternative, the client application 200 may integrate access to content management system 100 with the local file management system provided by operating system 250. When access to content management system 100 is integrated in the local file management system, a file organization scheme maintained at content management system is represented as a local file structure by operating system 250 in conjunction with client application 200.

Client application 200 manages access to content management system 100 and document generation management module 324. Client application 200 includes user interface module 202 that generates an interface to the content accessed by client application 200 and is one means for performing this function. The generated interface is provided to the user by display 210. Client application 200 may store content accessed from content storage at content management system 100 in local content 204. While represented here as within client application 200, local content 204 may be stored with other data for client device 120 in non-volatile storage. When local content 204 is stored this way, the content is available to the user and other applications or modules, such as document editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

In certain embodiments, client device 120 includes additional components such as camera 230 and location module 240. Camera 230 may be any camera or device capable of recording images. Location module 240 determines the location of client device 120, using, for example, a global positioning satellite signal, cellular tower triangulation, or other methods. Location module 240 may be used by client application 200 to obtain location data and add the location data to metadata about a content item.

Content Management System

Figure 3:
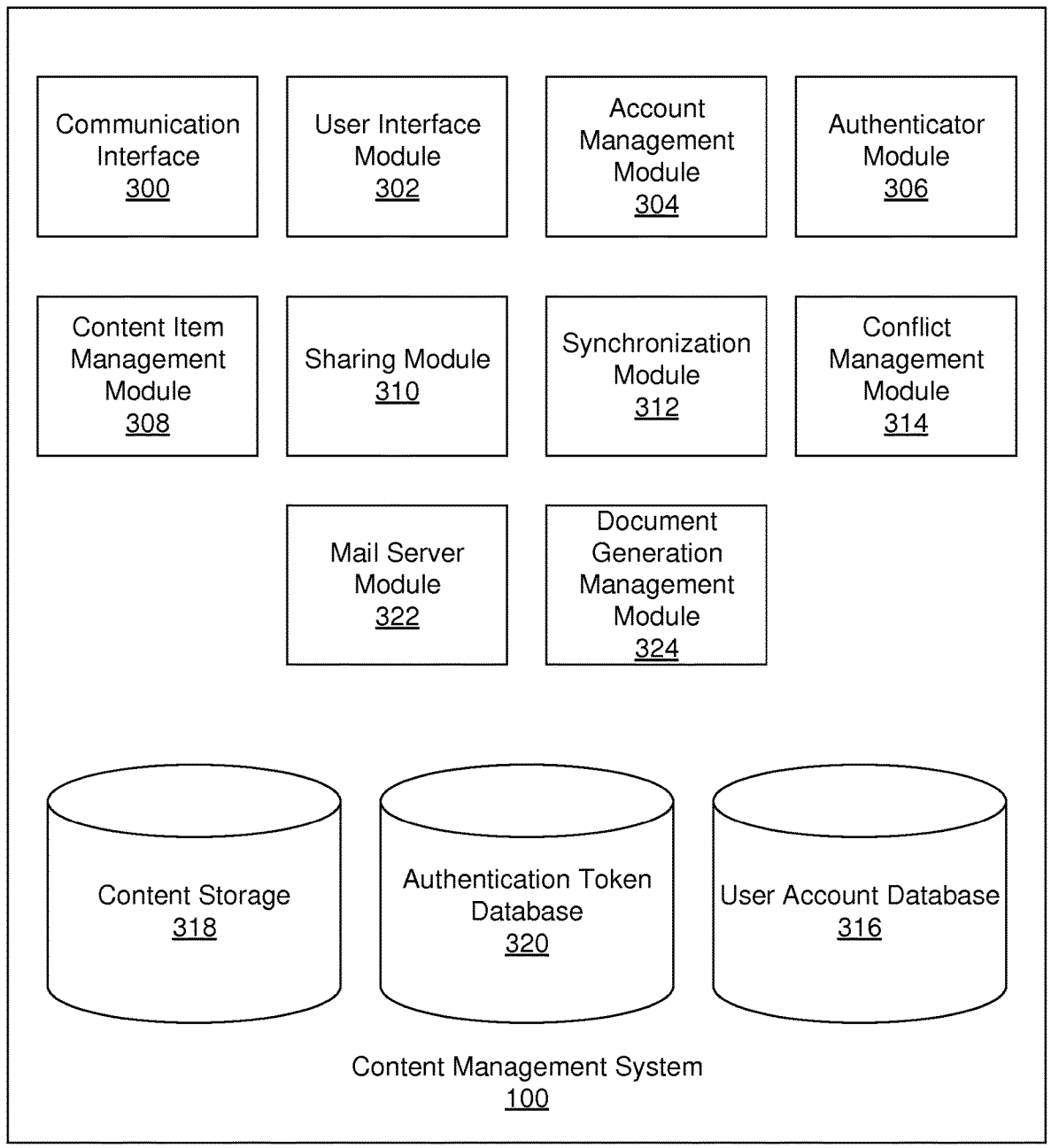
FIG. 3 shows a block diagram of a content management system, according to some embodiments.

FIG. 3 shows a block diagram of content management system 100 according to some embodiments. Content management system 100 may include communication interface 300, user interface module 302, account management module 304, authenticator module 306, content item management module 308, sharing module 310, synchronization module 312, conflict management module 314, mail server module 322, document generation management module 324, content storage 318, authentication token database 320, and user account database 316.

To facilitate the various content management services, a user can create an account with content management system 100. The account information can be maintained in user account database 316, and is one means for performing this function. User account database 316 can store profile information for registered users. In some cases, the only personal information in the user profile can be a username and/or email address. However, content management system 100 can also be configured to accept additional user information, such as password recovery information, demographics information, payment information, and other details. Each user is associated with a userID and a user name. For purposes of convenience, references herein to information such as documents or other data being "associated" with a user are understood to mean an association between a document and either of the above forms of user identifier for the user.

Similarly, data processing operations on documents and users are understood to be operations performed on corresponding identifiers such as documentID and userIDs. For example, a user may be associated with a document by storing the information linking the userID and the documentID in a table, file, or other storage formats. For example, a database table organized by documentIDs can include a column listing the userID of each user associated with the document. As another example, for each userID, a file can list a set of documentIDs associated with the user. As another example, a single file can list key value pairs such as <userID, documentID> representing the association between an individual user and a document. The same types of mechanisms can be used to associate users with comments, threads, text elements, formatting attributes, and the like.

User account database 316 can also include account management information, such as account type, e.g. free or paid; usage information for each user such as file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content, such as documents, audio files, video files, etc., from one or more client devices associated with the account. The content can also include folders of various types with different behaviors, or other content item grouping methods. For example, an account can include a public folder that is accessible to any user. The public folder can be assigned a web-accessible address. A link to the web-accessible address can be used to access the contents of the public folder. In another example, an account can include photos folder that is intended for photos and that provides specific attributes and actions tailored for photos; an audio folder that provides the ability to play back audio files and perform other audio related actions; and/or other special purpose folders. An account can also include shared folders or group folders that are linked with and available to multiple user accounts. The permissions for multiple users may be different for a shared folder.

Content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 stores a single copy and then use a pointer or other mechanism to link the duplicates to the single copy. Similarly, content storage 318 stores files using a file version control mechanism that tracks changes to files, different versions of files (such as a diverging version tree), and a change history. The change history includes a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in file systems of client device 120 with content in an associated user account on content management system 100. Client application 200 synchronizes any changes to content in a designated folder and its subfolders with the synchronization module 312. Such changes include new, deleted, modified, copied, and/or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate a web browser to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120. In some embodiments, user interface module 302 may be configured to gather one or more content items from content storage 318. In various embodiments, the user interface module 302 accesses APIs when gathering specific object items (e.g., files) and/or content types (e.g., .pdfs, .docs, .mpgs, or the like). In one example, user interface module 302 may store or assist in retrieving objects (e.g., files and/or the like) from storage (e.g., a cloud storage accessible over a network). User interface module 302 may provide object items to the other modules of content management system 100.

Content management system 100 includes communication interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a website.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes content item management module 308 for maintaining a content directory that identifies the location of each content item in content storage 318, and allows client applications to request access to content items in content storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

Content management system 100 includes a sharing module 310 for sharing content publicly or privately, which is one means for performing this function. Sharing content publicly can include making the content item accessible from any computing device in network communication with content management system 100. Sharing content privately can include linking a content item in content storage 318 with two or more user accounts so that each user account has access to the content item. The content can also be shared across varying types of user accounts.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

To share a content item privately, sharing module 310 adds a user account identifier to the content entry associated with the content item, thus granting the added user account access to the content item. Sharing module 310 can also be configured to remove user account identifiers from a content entry to restrict a user account's access to the content item.

To share content publicly, sharing module 310 generates a custom network address, such as a URL, which allows any web browser to access the content in content management system 100 without any authentication. The sharing module 310 includes content identification data in the generated URL, which can later be used by content management system 100 to identify properly and return the requested content item. For example, sharing module 310 can be configured to include the user account identifier and the content path in the generated URL. The content identification data included in the URL can be transmitted to content management system 100 by a client device to access the content item. In addition to generating the URL, sharing module 310 can also be configured to record that a URL to the content item has been created. In some embodiments, the content entry associated with a content item can include a URL flag indicating whether a URL to the content item has been created.

Content management system 100 may include mail server module 322. Mail server module 322 may interface with mail servers. Mail server module 322 may obtain electronic mail and/or store electronic mail on mail servers.

Figure 4:
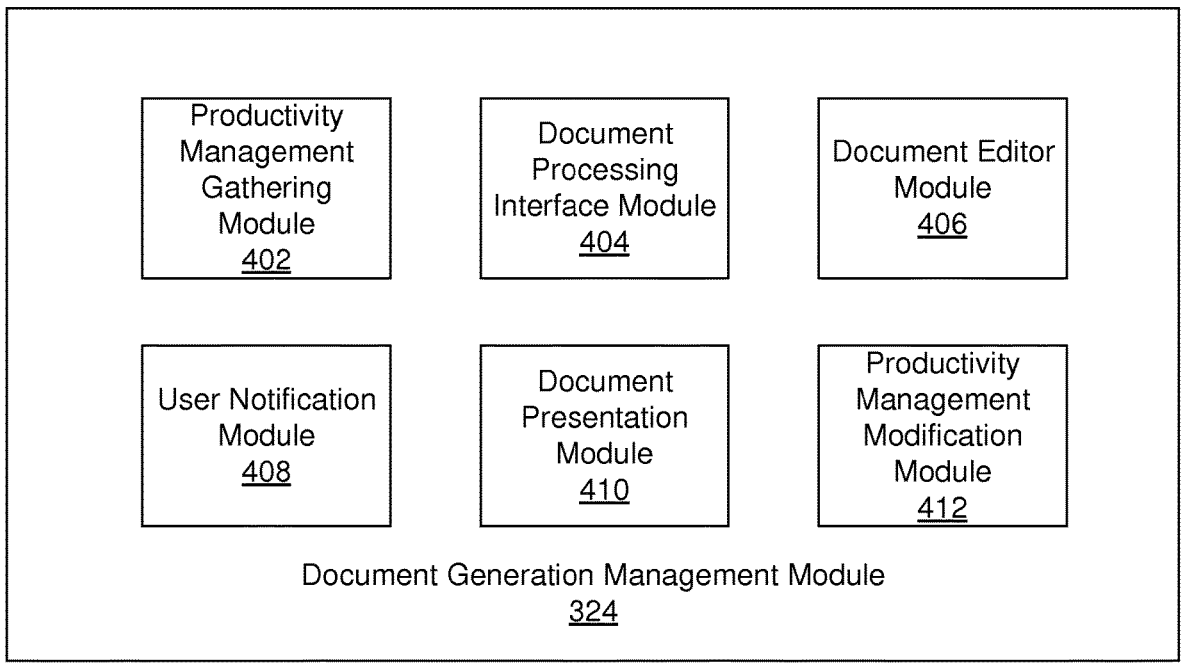
FIG. 4 shows an example document generation management module, according to some embodiments.

Content management system 100 may include document generation management module 324. Document generation management module 324 may create and/or manage collaborative documents. As discussed further herein, document generation management module 324 may create collaborative documents in response to new calendar entries that are created in productivity management system 140. The collaborative documents may be filled with predefined information, such as predefined dates, times, locations, agendas, etc. associated with a corresponding event entry in the productivity management system 140. FIG. 4 shows document generation management module 324 in greater detail.

FIG. 4 shows an example document generation management module 324, according to some embodiments. Document generation management module 324 may include productivity management gathering module 402, document processing interface module 404, document editor module 406, user notification module 408, document presentation module 410, and productivity management modification module 412. One or more of productivity management gathering module 402, document processing interface module 404, document editor module 406, user notification module 408, document presentation module 410, and productivity management modification module 412 may be coupled to one another or to modules not explicitly shown.

Productivity management gathering module 402 may be configured to gather productivity data from productivity management system 140. In various embodiments, productivity management gathering module 402 identifies an event and gathers information related to the event. For instance, productivity management gathering module 402 may gather a specific calendar entry and/or a specific task from an online calendar. Productivity management gathering module 402 may further gather information from the calendar entry or gather information related to the calendar entry such as time(s), date(s), relevant locations, title(s), agenda(s), summaries, description(s), and/or attendees related to the event. Productivity management gathering module 402 may provide the productivity data to the other modules of document generation management module 324.

Document processing interface module 404 may be configured to interface with document generation management module 324. In various embodiments, document processing interface module 404 may provide collaborative documents to one or more modules of document generation management module 324, as described further herein.

Document editor module 406 may be configured to create and/or modify collaborative documents. A collaborative document may be created in a variety of ways. In some embodiments, document editor module 406 enables creation of the collaborative document into the content management system 100. Document editor module 406 may enable access to or be any document editing application (e.g., Microsoft Word®, Google Docs®, or the like) either in the cloud or executed locally. In one example, content management system 100 may provide to one of client devices 120 a user interface element (e.g., a box or a button) that allows creation of a new collaborative document.

In some embodiments, document editor module 406 may create the collaborative document in conjunction with the productivity management system 140. For example, document editor module 406 may provide a suggestion to a user to create or invoke a collaborative document associated with an upcoming event. In various embodiments, document generation management module 324 may identify a user that is opening or otherwise using document editor module 406. Productivity management gathering module 402 may identify an upcoming event for the user on the user's calendar. Subsequently, document editor module 406 may provide a suggestion to the user to create or invoke the collaborative document associated with the upcoming event.

Although it is discussed that document editor module 406 may provide a suggestion to the user to create or invoke the collaborative document associated with the upcoming event, it will be appreciated that the suggestion to create or invoke the collaborative document may be made by any application. For example, a user may log into and/or otherwise access any application or suite of applications. Once the user is identified and an upcoming event is identified on the user's calendar, any application may provide the user with the suggestion to create or invoke the collaborative document associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaborative document in response to the suggestion, document editor module 406 may create or invoke the requested collaborative document. If the application that provided the suggestion to the user is not a document editor, then a document editor may be executed and the requested collaborative document created and/or invoked in response to the user's request.

In accordance with some embodiments, document editor module 406 may configure the productivity management system 140 to provide access to the collaborative document (e.g., using a link, including the collaborative document, or any other mechanism to enable access to the collaborative document) in a meeting request, a task entry, or the like. In some embodiments, document editor module 406 may instruct productivity management system 140 to place an icon corresponding to a link to the collaborative document in the calendar entry, meeting request, task entry, or the like. When a user has opened the link (e.g., by clicking the icon), the user may be directly guided to the collaborative document from the meeting request, task entry, or the like. In one example, the link in the calendar entry may provide the user (e.g., using client device 120) access to a collaborative document stored in content management system 100 (e.g., in storage accessible through the cloud) or in productivity management system 140.

Once the user requests to create or invoke the collaborative document, document editor module 406 may create and/or invoke a collaborative document. The collaborative document may be subsequently edited, altered, viewed, changed, stored, and/or the like by an editing application (e.g., either stored locally on a client device 120 or in the cloud). In various embodiments, one or more different client devices 120 may utilize different editing applications to make changes to the collaborative document. Document editor module 406 and/or other editing applications may allow for the collaborative document to be changed by multiple different users using different client devices 120 at the same time or substantially at the same time (e.g., in real time or substantially in real time).

It will be appreciated that users may be automatically guided to a collaborative document related to a calendar entry, meeting request, a task entry, or the like without human intervention. In some embodiments, users may be guided to a collaborative document related to a calendar entry, a meeting request, a task entry, or the like without having the users separately open collaborative document editing applications. Such functionalities may prove particularly convenient for users seeking to take, review, or collaborate on notes associated with an event, as these users need not open applications other than productivity management applications.

Document editor module 406 may create a collaborative document for a specific event. In an embodiment, when creating a first collaborative document for an event, document editor module 406 may prevent other users from creating additional collaborative documents for the same event. Document editor module 406 may allow only the creator of a calendar entry corresponding to the event to create the collaborative document for the event. In another example, document editor module 406 may limit creation of the collaborative document to a limited number of users (or their client devices) (e.g., attendees identified by the calendar entry, attendees who have accepted the calendar entry, a work group, or any other individual or group). As a result, document editor module 406 may allow users to work from a master collaborative document for an event. The master collaborative document may serve numerous purposes, including limiting the existence of conflicting collaborative documents related to the event. For example, a single collaborative document may allow for users to collaborate together regarding the event including, for example, to create a summary, create an agenda, or discuss issues related to the event.

Document editor module 406 may suggest content for the collaborative document using the information related to the event. For example, document editor module 406 may suggest (e.g., automatically include) a title in the collaborative document or any other information. For example, document editor module 406 may include a title obtained from the calendar entry, task list, and/or the like that is related to the event. Productivity management gathering module 402 may provide the title or any other information related to the event. Further, document editor module 406 may suggest other content for the collaborative content, such as time(s), date(s) and/or attendee lists(s) of the event. The time(s), date(s), and/or attendee list(s) may be included into any relevant portion of the collaborative document. In one example, document editor module 406 may include a title of a calendar entry as a title of the collaborative document. Further, document editor module 406 may include the time(s) and date(s) of the event from the calendar entry in the title or subheading of the collaborative document. Document editor module 406 may further identify attendee(s) (e.g., those invited to the event) from the calendar entry in a subheading or dedicated portion of the collaborative document.

Document editor module 406 may suggest recipients for access to the collaborative document based on the information related to the event. For example, document editor module 406 may incorporate names, email addresses, phone numbers, and/or the like of users who have been invited to the event or who have accepted the calendar entry. In some embodiments, productivity management gathering module 402 may provide information regarding recipients. For example, productivity management gathering module 402 may provide information regarding recipients from a mail server, contacts database, email address system, user profile system, and/or the like.

In some embodiments, document editor module 406 may suggest all users who have indicated that they have accepted an invite to attend the event to receive access to the collaborative document. For example, document editor module 406 may identify specific users who have accepted an invite related to the event as well as specific users who have not accepted (e.g., declined or marked acceptance as tentative) an invite related to the event. Document editor module 406 may ensure that only the specific users who accepted the invite are suggested as recipients to access the collaborative document.

It will be appreciated that document editor module 406 may identify or otherwise suggest a subset of attendees of a calendar entry to be recipients of the collaborative document. Document editor module 406 may suggest users to receive access to the collaborative document (e.g., recipients to receive the collaborative document or a link to the collaborative document) based on any number of factors. For example, document editor module 406 may suggest that recipients of the collaborative document include attendees of the event who are in the same enterprise as an enterprise associated with the creator of the collaborative document. In another example, document editor module 406 may suggest attendees of the event who are members of a group (e.g., attendees who are both attendees and in the same group as the creator of the calendar entry or users who are both attendees and in the same group as the user who first invoked the collaborative document). In some embodiments, document editor module 406 enables the user who created or invoked the collaborative document to specifically select recipients of the collaborative document.

In various implementations, document editor module 406 suggests attendees of the event whose email addresses share the same domain name as the user that created or invoked the collaborative document. For example, document editor module 406 may connect through network 110 to a mail server, an address server, or other device in an enterprise, to obtain email addresses of all attendees of the event who are members of the enterprise. Devices in the enterprise may provide information about the identities of the attendees in the enterprise. As an example, the devices in the enterprises may provide the email addresses and names of all attendees of the event having email addresses with a domain name corresponding to the enterprise's domain name. Document editor module 406 may suggest recipients of the collaborative document based on the email addresses and/or names of the attendees provided by the devices.

In some embodiments, document editor module 406 may suggest all attendees of the event who share a group affiliation with the creator of the collaborative document and/or the creator of the calendar entry. Document editor module 406 may connect through network 110 to a mail server or to a client device associated with the creator and obtain the identities of attendees who are members of groups to which the creator/invoker of the collaborative document and/or the creator of the calendar entry is a member. The group may comprise a closed and/or trusted group. Document editor module 406 may suggest recipients of the collaborative document based on the identities of the users from the mail server or client device.

As yet another example, document editor module 406 may suggest all attendees of the event who are identified by a system administrator to belong to the same or similar group as the creator or invoker of the collaborative document. Document editor module 406 may receive commands from a system administrator or system administrator service to identify attendees or any individuals belonging to the same or similar group as the creator or invoker of the collaborative document. The commands may specify users and/or email addresses to be suggested by the collaborative document by document editor module 406.

As yet another example, document editor module 406 may suggest all attendees of the event who have exchanged past emails or participated in past events with the creator of the collaborative document and/or the creator of the calendar entry. In some embodiments, document editor module 406 may suggest all attendees of the event or any user(s) who have participated in past events involving subject matter similar to the subject matter of the event. Document editor module 406 may connect through network 110 to a mail server or to a client device associated with the creator to obtain names, email addresses, and/or other information related to such attendees and/or users. Document editor module 406 may use the retrieved names, email addresses, and/or other information to identify and/or suggested recipients of the collaborative document.

As yet another example, document editor module 406 may allow users to enter a specified character (e.g., an ampersand "@" character) and may provide, in response to the specified character, a menu that suggests relevant users as recipients. Document editor module 406 may prefill portions of the collaborative document with suggested recipients. As an example of portions that may be prefilled, document editor module 406 may prefill recipient fields of the collaborative document with information related to suggested recipients.

Document editor module 406 may further receive from users additional content for the collaborative document. For example, document editor module 406 may be configured to receive from the client devices 120 changes or edits to the collaborative document. In various embodiments, the changes may include text, characters strings, or the like. The changes may also include annotations to the collaborative document, comments to the collaborative document, files to be attached to the collaborative document, pictures to be attached to the collaborative document, links to be attached to the collaborative document, tasks related to the collaborative document, or the like that can be incorporated into the collaborative document. In various embodiments, edits to the collaborative document are collaborative. For instance, document editor module 406 may obtain edits (e.g., text changes and/or additions of audio files, pictures, tables, or the like) from any number of client devices 120 at a given time (or in real time). Collaborative edits may be incorporated in a variety of formats, including formats that provide different text attributes such as colors, fonts, styles, or the like for different users.

In various embodiments, document editor module 406 (and or a security or permissions module associated with a server) may establish permissions and/or security for the collaborative document. For example, document editor module 406 may enable event attendees to view and/or make edits to the collaborative document while others may not have rights to view the collaborative documents and/or make changes. Permissions and/or security may be enforced in any number of ways. However, access to the collaborative document may, in various embodiments, be provided to attendees of the event or a subset of attendees.

In various embodiments, access to the collaborative document is limited based on storage access rights. For example, a user with access rights to cloud storage may access, view, and/or make changes to the collaborative document. In some embodiments, a user with access rights assigned by the content management system 100 may access, view, and/or make changes to the collaborative document.

User notification module 408 may be configured to notify users of each of the client devices 120 of information related to the state and/or contents of the collaborative document. Notifications may be sent, for example as an email notification, a chat message notification, or a task notification. In various embodiments, user notification module 408 provides notifications about changes to the client devices 120. For example, user notification module 408 may notify users whether a collaborative document has been created for an event. As another example, user notification module 408 may notify specific users that they have been invited to attend an event.

Document presentation module 410 may provide to the client devices 120 collaborative documents related to an event. The collaborative documents may be displayed in the client devices 120 on a native application, Internet browsing window, or the like supported by the client devices 120. In various embodiments, document presentation module 410 publishes a collaborative document after the event has concluded. For instance, document presentation module 410 may restrict writing permissions to the collaborative document (and turn the collaborative document into a read-only document) after the event has concluded.

It will be appreciated that document presentation module 410 may restrict writing permissions to the collaborative documents at any time. In an example, prior to occurrence of the event, document presentation module 410 may restrict writing permissions to the collaborative document (and turn the collaborative document into a read-only document) for all users except the creator or invoker of the collaborative document. In some embodiments, the creator or invoker of the collaborative document may select a subset of recipients to receive writing permissions.

Document presentation module 410 may also support a document viewing portal users can use to view collaborative documents related to past events. The document viewing portal may order specific collaborative documents based on one or more ordering factors. "Ordering factors," as used herein, may include any factors used to order collaborative documents. Ordering factors can include factors used to order collaborative documents chronologically. More specifically, in some embodiments, the document viewing portal orders collaborative documents according to the date(s) and/or times the collaborative documents were created. The document viewing portal may also order collaborative documents according to the date(s) and/or time(s) the collaborative documents were edited. In various embodiments, the document viewing portal orders collaborative documents according to the date(s) and/or time(s) of the events to which the collaborative documents were related. Ordering factors can also include factors used to order collaborative documents according to the preferences of a specific user, such as whether the user has accepted events to which the collaborative documents were related.

In some embodiments, a document viewing portal may be dedicated to a particular user who has received access to the collaborative document because the particular user was invited to the event. The user's document viewing portal may provide access to any number of documents including the collaborative document. The documents represented in the document viewing portal may be ordered in any number of ways. For example, the document viewing portal may order documents based on date and time of event thereby changing the order of the documents in the document viewing portal as the event draws near.

The document viewing portal may support search functions. For instance, the document viewing portal may enable or allow searching for collaborative documents according to textual strings, titles, event attendees, and/or other attributes. The search functions may allow a specific user to search one or more collaborative documents for that user or for other users.

It will be appreciated that a collaborative document may be associated with a recurring event (e.g., a semiannual meeting). In some implementations, the search functions may present the collaborative document to event attendees as each recurring event draws near as indicated in productivity management systems of the event attendees.

In some embodiments, productivity management modification module 412 may be configured to change the calendar entry to enable access to the collaborative document. For example, once the collaborative document is created and/or stored in the content management system 100, productivity management modification module 412 may modify the related calendar entry for the event to provide a link to the collaborative document (e.g., a link to a version of the collaborative document stored in cloud storage). Although a link is discussed, it will be appreciated that productivity management modification module 412 may enable access to the collaborative document in any number of ways (e.g., providing a copy of the collaborative document).

Productivity management modification module 412 may modify calendar entries for all recipients of the calendar entry. For example, while a user is creating the calendar entry, the user may create a collaborative document associated with the calendar entry. Productivity management modification module 412 may modify the calendar entry before the calendar entry is provided to the recipients. In another example, after a user created a calendar entry and the calendar entry is sent to the recipients, the user may create a collaborative document. Productivity management modification module 412 may modify any number of calendar entries to any number of users who had previously received the calendar entry (e.g., by providing commands to productivity management system 140 to change the calendar entries already sent). In another example, productivity management modification module 412 may provide or assist in providing (e.g., with the productivity management system 140) a new or updated calendar entry with access to the collaborative document. In some embodiments, the productivity management modification module 412 may provide a calendar entry that allows a limited number of recipients access to the collaborative document. The limited number of recipients may comprise a group of recipients associated by group affiliation, a group of recipients selected by a creator of the calendar entry, or a group of recipients who have accepted the calendar entry.

Figure 5:
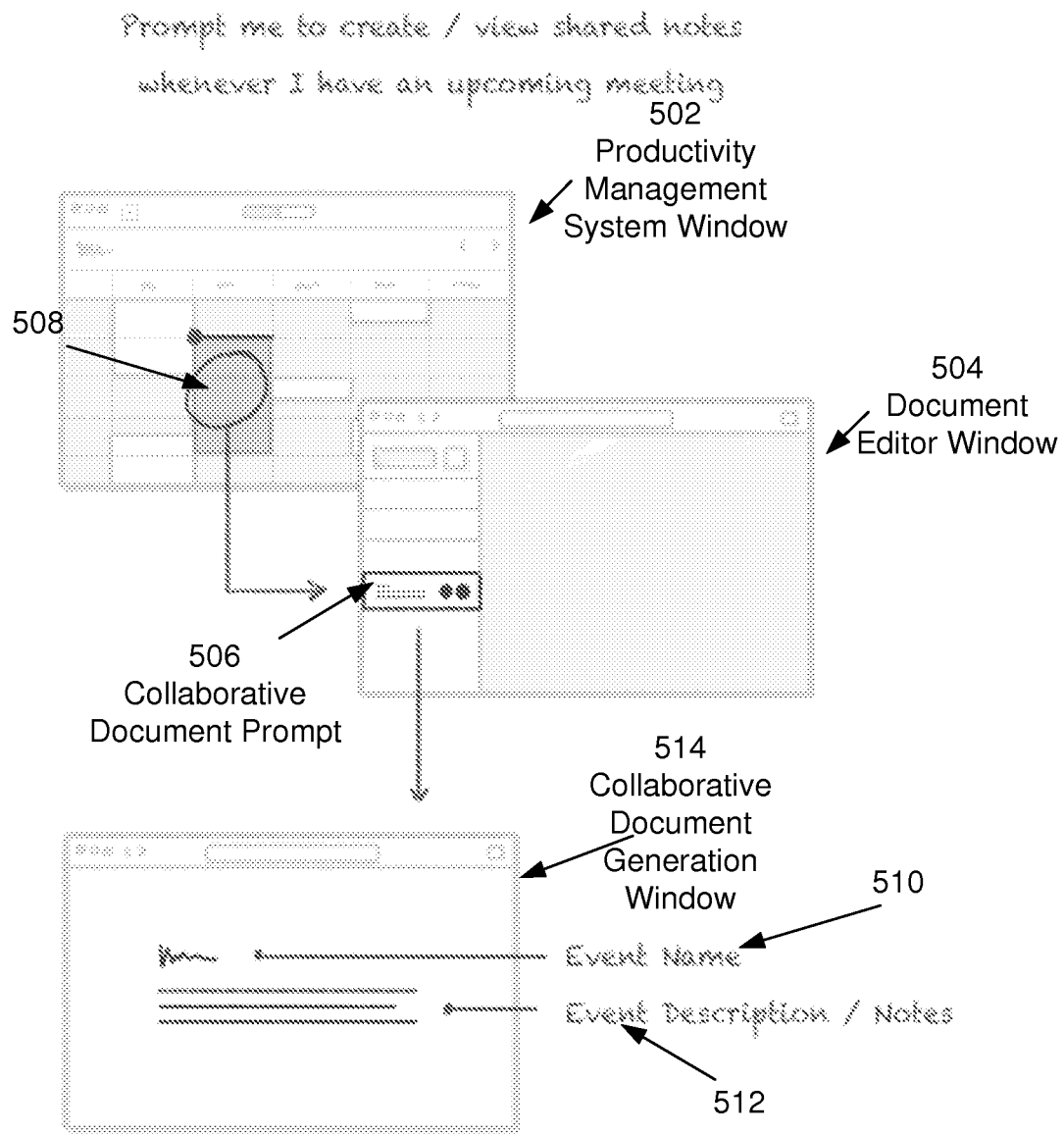
FIG. 5 shows an example diagram of windows that may appear on a user device when creating a collaborative document related to an event, according to some embodiments.

FIG. 5 shows an example diagram of windows 500 that may appear on a user device when creating a collaborative document related to an event, according to some embodiments. Windows 500 include productivity management system window 502, document editor window 504, and collaborative document prompt associated with event 508. Any of windows 500 may show user interface elements that appear on one of the user device(s) 110 when creating and editing a collaborative document for an event.

Productivity management system window 502 may include a window provided by productivity management system 104. In this example, productivity management system window 502 corresponds to a monthly view of a network-accessible calendar. As event 508 approaches, document generation management module 324 may suggest to a user attending the event to create or invoke a collaborative document related to the event. In one example, document generation management module 324 generates document editor window 504 when the user activates a document editor.

Document editor window 504 may allow a user to create a collaborative document for upcoming event 508. Document editor window 504 may include a collaborative document prompt 506 associated with upcoming event 508. Collaborative document prompt 506 may be a suggestion to the user who invoked document editor window 504 to create or invoke a collaborative document associated with upcoming event 508. It will be appreciated that there may be any number of prompts suggesting different documents in document editor window 504. Document editor window 504 may order the prompts based on, for example, proximity of the occurrence of the event. For instance, document editor window 504 may depict collaborative document prompt 506 at the top of all other prompts if the occurrence of event 508 is imminent. If event 508 is not occurring for a long period of time (e.g., months), document editor window 504 may depict collaborative document prompt 506 below many or all other prompts. As event 508 approaches, document editor window 504 may depict collaborative document prompt 506 higher in the list of prompts.

In response to a user selecting collaborative document prompt 506, document generation management module 324 may generate collaborative document generation window 514 to enable the user to create or invoke the collaborative document. Collaborative document generation window 514 may include any or all information from event 508 calendar entry. This information may include event name 510 and event description/notes 512. Suggested event name 510 and suggested event description/notes 512 may be obtained by document management system 130 to display in collaborative document generation window 514 using techniques described herein.

Figure 6:
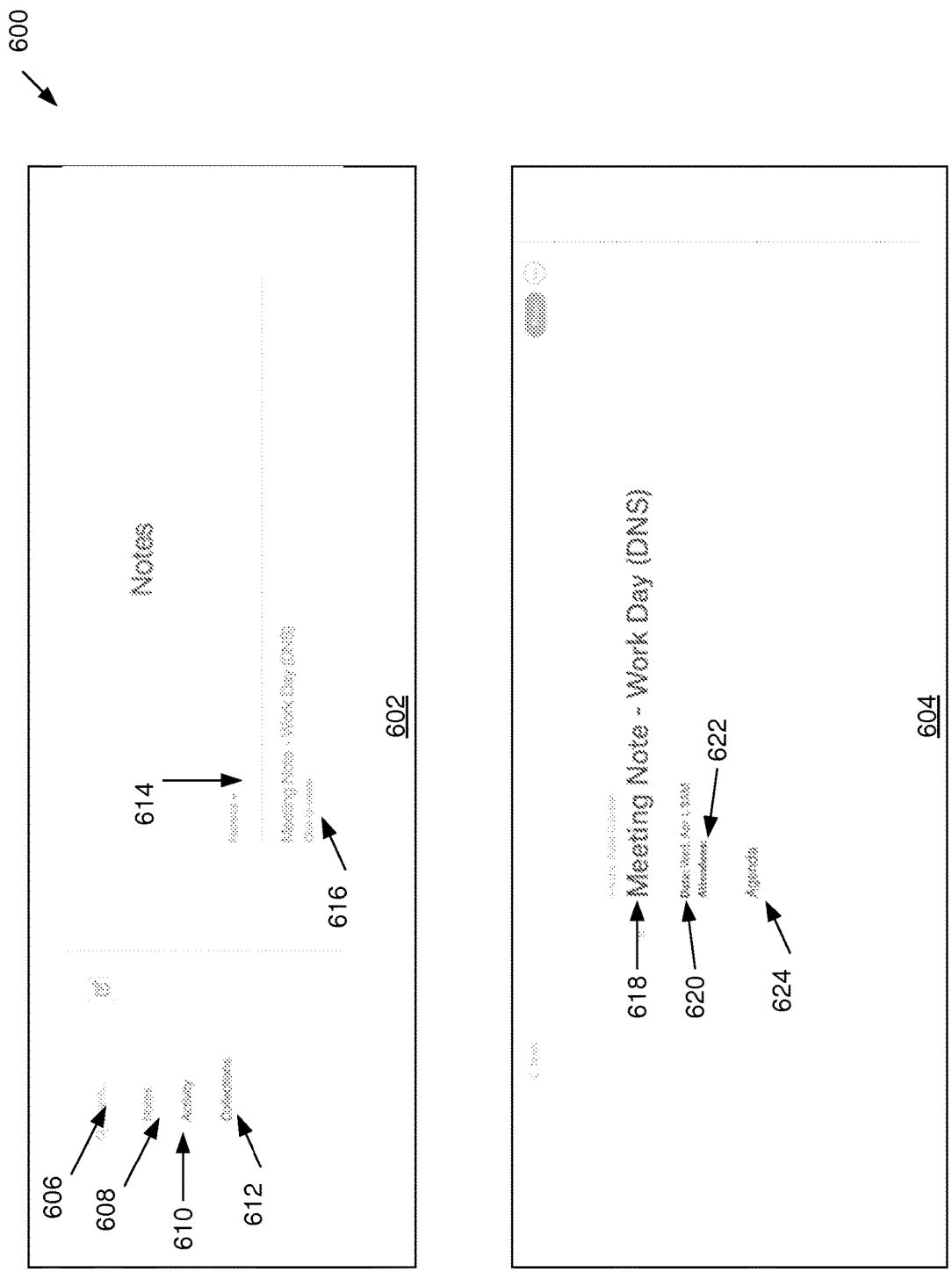
FIG. 6 shows example windows related to a collaborative document portal according to some embodiments.

FIG. 6 shows example windows 600 related to a collaborative document portal according to some embodiments. As discussed herein, windows 600 show user interface elements that may appear on one of user device(s) 110 when creating and/or editing a collaborative document associated with an event. Windows 600 include first window 602 and second window 604. The first windows 602 and/or second window 604 of FIG. 6 may correspond to collaborative document generation window 514 in FIG. 5. First window 602 includes search box 606, collaborative document tab 608, activity tab 610, and collections tab 612. In this example, collaborative document tab 608 has been selected. Collaborative document tab 608 displays list 614 of recent collaborative documents on first window 602. The list of collaborative documents may be associated with a user (e.g., a user associated with a workspace interface or the like), calendar entries, events of interest, subject matter, organization, and/or the like. Collaborative document tab 608 also displays link 616 for showing a specific collaborative document on first window 602. If link 616 has been selected, the user may navigate to second window 604.

In second window 604, a specific collaborative document is shown. The specific collaborative document includes title 618, time and date 620, names of attendees 622, and agenda 624. In this example, title 618 and time and date 620 may be added to the collaborative document (e.g., automatically) based on information from the calendar entry and/or the event. Similarly, document generation management module 324 may populate invitees from the calendar entry into a field for attendees 622. Document generation management module 324 may add portions from the calendar entry in a field for agenda 624 and/or the user may enter information in the field. In various embodiments, a user may use one of user device(s) 110 to manually add or replace text for attendees 622 and/or agenda 624.

Figure 7:
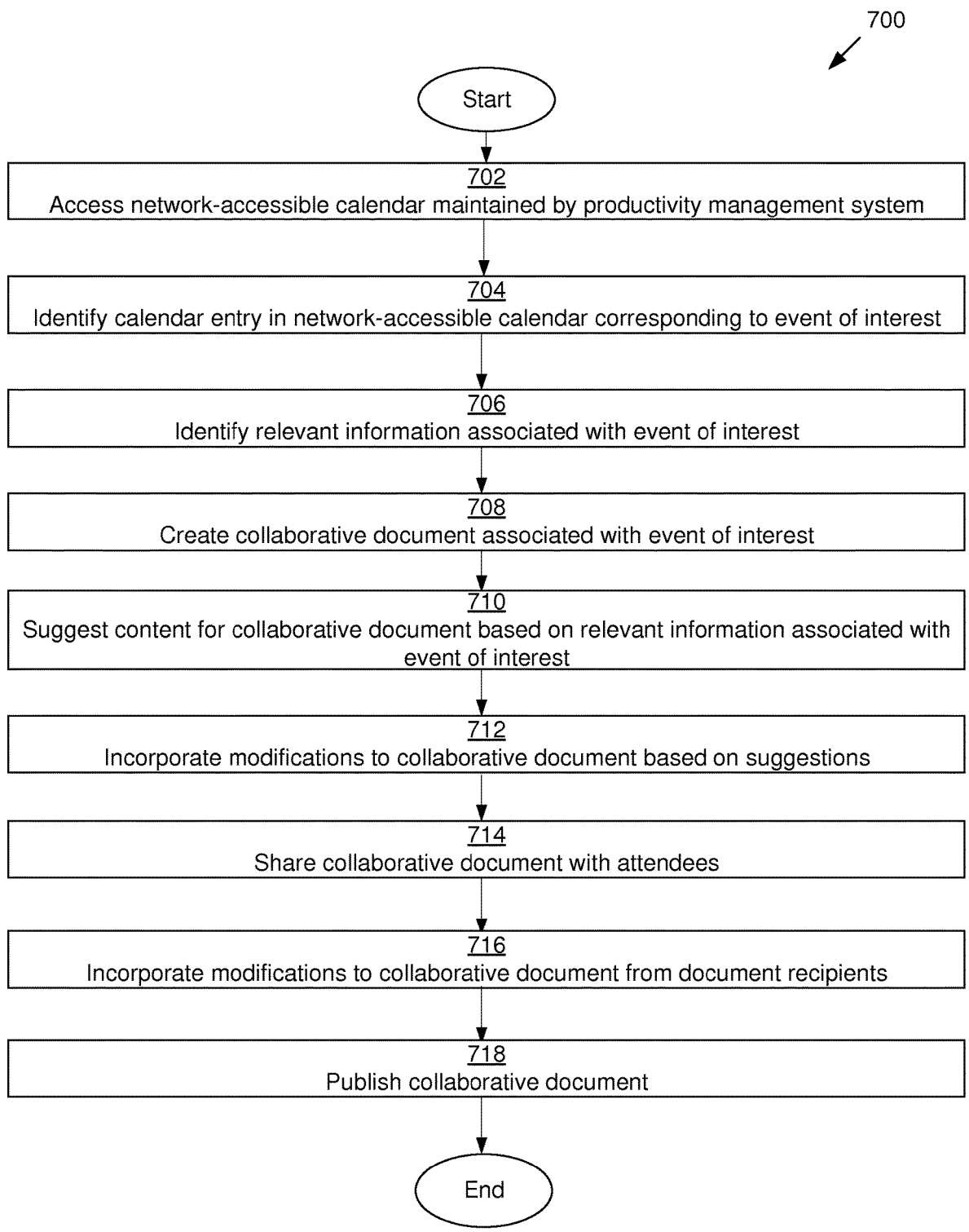
FIG. 7 shows an example process for generating a collaborative document related to an event, according to some embodiments.

FIG. 7 shows an example process 700 for generating a collaborative document related to an event, according to some embodiments. In the following example, the process 700 is discussed herein in conjunction with the structures of the content management system 100 and the document generation management module 324, shown in FIG. 3 and FIG. 4. It will be understood that there can be additional, fewer, or alternative steps performed in similar or alternative orders, or in parallel, within the scope of the various embodiments unless otherwise stated.

At step 702, productivity management gathering module 402 accesses a network-accessible calendar maintained by the productivity management system 140. In various embodiments, productivity management gathering module 402 accesses APIs maintained by the productivity management system 140 and gathers productivity data, such as data related to scheduling, calendar entry management, task management, and/or contact management. For instance, productivity management gathering module 402 may gather any number of calendar(s), calendar entr(ies), task list(s), and/or contact(s) maintained by the productivity management system 140. Productivity management gathering module 402 may provide the productivity data to the other modules of the document generation management module 324.

At step 704, productivity management gathering module 402 identifies in the network-accessible calendar a calendar entry corresponding to an event. In some embodiments, the event may be a specific calendar entry identified by a user to be of interest. For instance, the event may be related to a calendar entry the user is trying to create in a calendar application. In some embodiments, productivity management gathering module 402 utilizes productivity management gathering module 402 to retrieve any number (e.g., one or more) of calendar entries.

In some embodiments, a user may create a calendar entry in an online calendar at the productivity management system 140. Either before or after the calendar entry is sent to invitees (e.g., attendees), the user may have the option to create a collaborative document through a link or button (e.g., a link or a button displayed on a calendar entry creation window) provided in a calendar entry or a prompt provided by document generation management module 324.

At step 706, document editor module 406 identifies relevant information associated with the event. More specifically, document editor module 406 may identify time(s), date(s), relevant location(s), title(s), agenda(s), summaries, description(s), and/or attendees associated with the event and/or the calendar entry. It will be appreciated that the collaborative document may, in some embodiments, be generated prior to document editor module 406 identifying relevant information associated with the event.

At step 708, document editor module 406 creates a collaborative document associated with the event. Document editor module 406 may store the collaborative document in a variety of locations, including in content management system 100 and/or document generation management system 324. It will be appreciated that document editor module 406 may create and/or store the collaborative document associated with the event before or after step 710.

At step 710, document editor module 406 optionally suggests content for the collaborative document based on the relevant information associated with the event. In various embodiments, document editor module 406 suggests time(s), date(s), relevant locations, title(s), agenda(s), summaries, description(s), and/or names of attendees to include in the collaborative document and/or as metadata associated with the collaborative document. In one example, document editor module 406 may include and/or prepopulate portions of the collaborative document with the relevant information. For instance, document editor module 406 may prepopulate the title of the collaborative document using the title of the event. Document editor module 406 may further use time(s), date(s), relevant locations, agenda(s), summaries, and/or description(s) to prepopulate portions of the collaborative document.

In some embodiments, document editor module 406 optionally suggests which event attendees (e.g., possible event attendees) that received or will receive the calendar entry may receive access to the collaborative document. For example, document editor module 406 may suggest which event attendees (or all attendees) are to receive an email with a link to the collaborative document and/or a new calendar entry with a link to the collaborative document.

At step 712, document editor module 406 incorporates modifications to the collaborative document based on the suggestions. In some embodiments, document editor module 406 allows one or more of the attendees, the creator of the collaborative document, the creator of the calendar entry, and/or another specified user or client device 120 to accept and/or deny suggestions to the contents of the collaborative document. In some embodiments, document editor module 406 allows only one user or client device 120 (e.g., the creator of the collaborative document) to accept content additions based on the suggestions.

At step 714, user notification module 408 shares the collaborative document with the attendees. The collaborative document may be shared by a hyperlink in an email, chat message, task assignment, or the like. Additionally or instead of user notification module 408 sharing the collaborative document, the productivity management modification module 412 may modify existing calendar entries for any number of the event attendees (including the creator of the collaborative document) to enable access to the collaborative document.

At step 716, document editor module 406 incorporates modifications to the collaborative document from document recipients (e.g., via client devices 120). More specifically, the creator of the collaborative document and/or document recipients of the collaborative document may provide changes to the collaborative document, particularly as the event is underway. Document editor module 406 may incorporate these and other modifications to the collaborative document.

In some embodiments, document editor module 406 allows one or more of the attendees, the creator of the collaborative document, the creator of the calendar entry, and/or another specified user or client device 120 to accept and/or deny modifications to the collaborative document. In some embodiments, document editor module 406 allows only one user or client device 120 (e.g., the creator of the collaborative document) to accept modifications suggested from the attendees.

At step 718, document presentation module 410 optionally publishes the collaborative document. For example, document presentation module 410 may restrict writing privileges to the collaborative document after a particular time (e.g., after the event has concluded). Document presentation module 410 may modify access to the collaborative document so that the collaborative document has read-only access. In some implementations, document presentation module 410 creates a read-only copy or version of the collaborative document. The read-only version of the collaborative document may be the version of the collaborative document sent to users by email, chat message, task assignment, or the like after the event.

Figure 8:
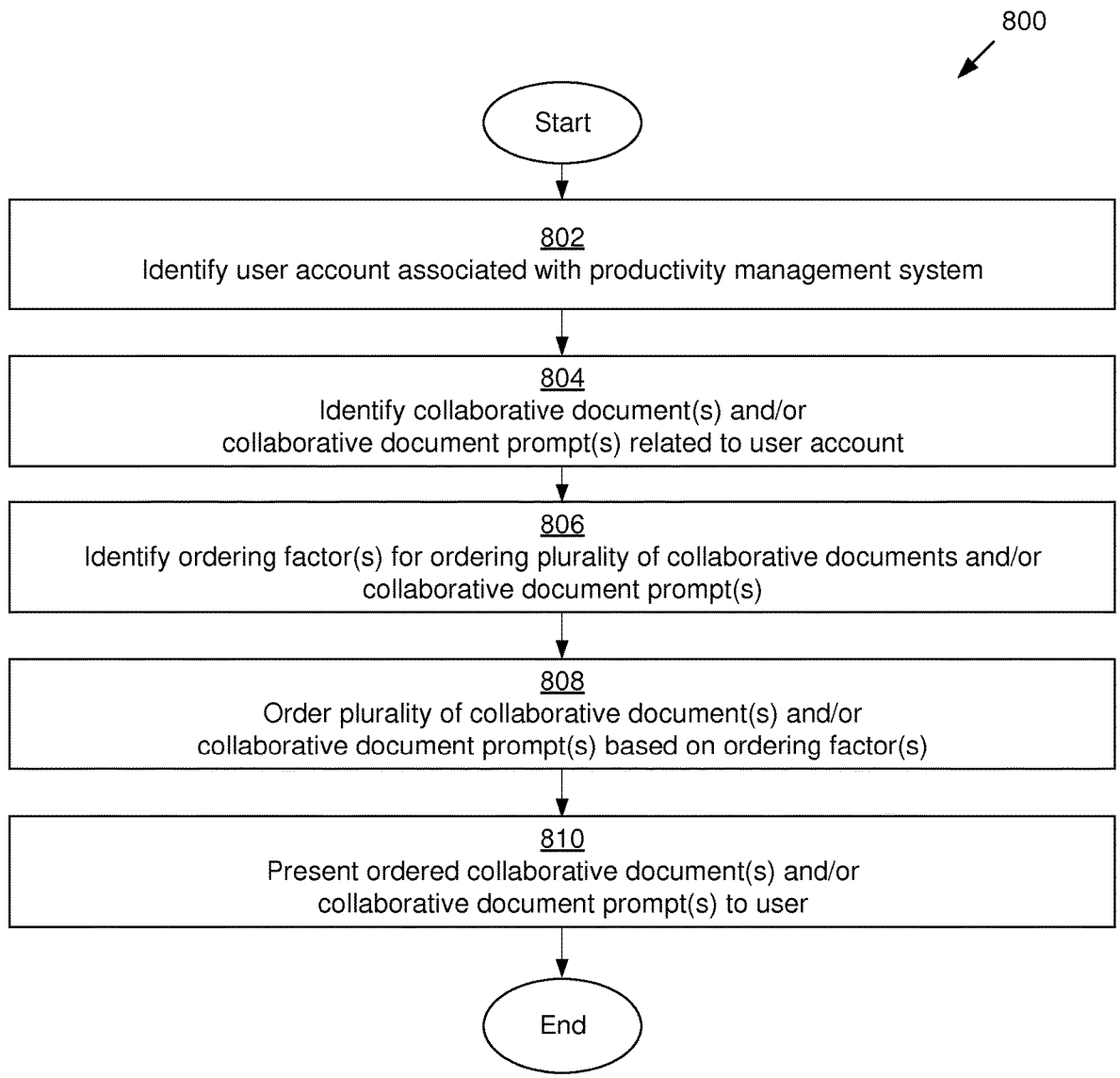
FIG. 8 shows an example process for ordering a plurality of collaborative documents, according to some embodiments.

FIG. 8 shows an example process 800 for making a collaborative document available to a user based on time and date of event, according to some embodiments. The process 800 is discussed in conjunction with the structures of content management system 100 and the document generation management module 324, shown in FIG. 1 and FIG. 3. It should be understood that there can be additional, fewer, or alternative steps performed in similar or alternative orders, or in parallel, within the scope of the various embodiments unless otherwise stated.

At step 802, document presentation module 410 identifies a user account associated with productivity management system 140. For example, document presentation module 410 may identify a specific user account for which collaborative documents are requested for a document viewing portal. The specific user account may correspond to an account a user of one of the client devices 120 uses to access email services, calendar services, task management services, or the like.

At step 804, document presentation module 410 identifies one or more collaborative documents and/or collaborative document prompts related to the user account. The collaborative documents may have been created in response to events in a productivity management system, using the techniques described herein. In various embodiments, document presentation module 410 retrieves from the content management system 100 collaborative documents related to the user. Document presentation module 410 may identify collaborative document(s) associated with any number of events, any number of calendar entries, subject matter, or the like. Document presentation module 410 may, in some embodiments, generate a workspace interface to enable access to one or more of the collaborative document(s).

In some embodiments, document presentation module 410 identifies one or more events to which the user has been invited. Document presentation module 410 may retrieve event information including time and date of event from productivity management modification module 412 to create collaborative document prompts. Each collaborative document prompt may be associated with different events. Further, each of the collaborative document prompts may be a suggestion to the user to create or invoke a collaborative document.

At step 806, document presentation module 410 determines one or more ordering factors for ordering a plurality of collaborative documents and/or collaborative document prompts. Document presentation module 410 may identify whether the collaborative documents are to be ordered chronologically (e.g., in order of date and time of event associated with each collaborative document) and/or according to the preferences of a specific user. In some embodiments, document presentation module 410 may identify whether the collaborative documents are to be ordered by their creation dates based on preferences or a system configuration. Document presentation module 410 may identify whether the collaborative documents are to be ordered by edit dates (e.g., dates on which the collaborative documents were edited) or ordered based on dates of corresponding events.

Document presentation module 410 may determine one or more ordering factors for ordering a plurality of collaborative document prompts. In some embodiments, a default of document presentation module 410 may be to order the collaborative document prompts based on time and date of their respective events. Users may provide ordering preferences to document presentation module 410 to change the order of the collaborative document prompts. For example, a user may input selection of certain collaborative document prompts to ignore or to depict lower on an ordered list of prompts even as the time and date of the event approaches.

At step 808, document presentation module 410 orders the plurality of collaborative documents and/or collaborative document prompts based on the one or more ordering factors. Ordering factors may include preferences of the specific user, system defaults, user commands, or the like. There may be any number of ordering factors. For example, document presentation module 410 may order collaborative documents based on date of event and time of event. If there are multiple collaborative documents with the same date of event and time of event, the document presentation module 410 may order those collaborative documents alphabetically using a title of the associated event.

Similarly, document presentation module 410 may order collaborative document prompts based on date of event and time of event. If there are multiple collaborative document prompts with the same date of event and time of event, the document presentation module 410 may order those collaborative document prompts alphabetically using a title of the associated event. As discussed herein, document presentation module 410 may order collaborative document prompts based on the user's ordering preferences.

At step 810, document presentation module 410 may present ordered collaborative documents and/or collaborative document prompts to the user. More particularly, document presentation module 410 may display the ordered collaborative documents and/or collaborative document prompts on one or more of the client devices 120. It will be appreciated that, in some embodiments, the user (e.g., via the client devices 120) may change the ordering of the collaborative documents and/or collaborative document prompts.

Figure 9:
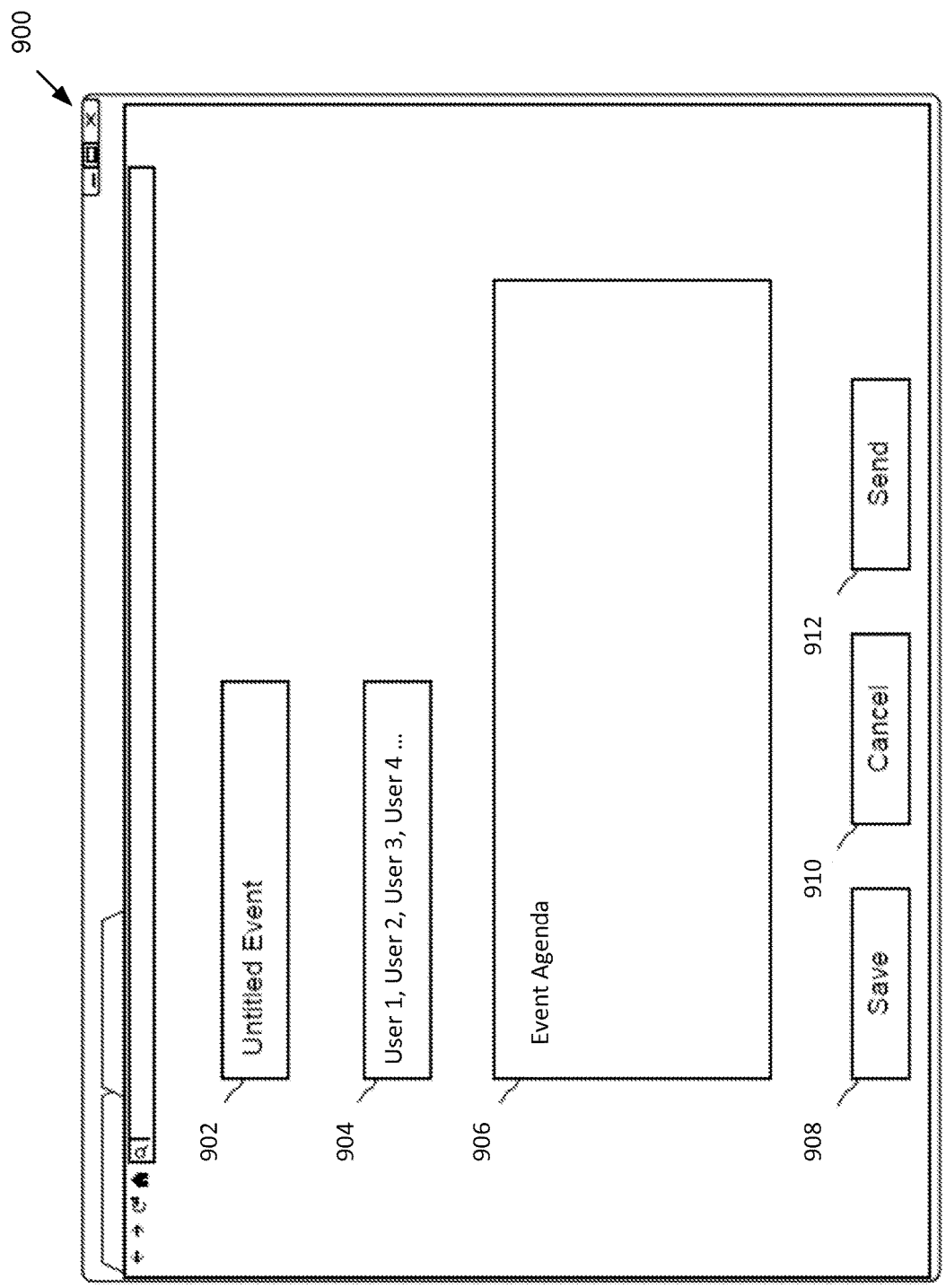
FIG. 9 shows an example collaborative document editing window of a content management system, according to some embodiments.

FIG. 9 shows an example collaborative document editing window 900 of a content management system, according to some embodiments. Collaborative document editing window 900 may include collaborative document title box 902, collaborative document recipient box 904, collaborative document description box 906, save button 908, cancel button 910, and send button 912. In various implementations, a creator may be guided to collaborative document editing window 900 in response to having new collaborative document prompt or other suggestion to create or invoke a collaborative document related to an event.

Collaborative document title box 902 may include a text box for a title for the collaborative document. In various implementations, collaborative document title box 902 automatically includes text (e.g., "Untitled Event") corresponding to the title of the event in a calendar entry. Collaborative document recipient box 904 may include a text box for a proposed list of recipients for the collaborative document. In an embodiment, collaborative document recipient box 904 is automatically populated with the usernames of event invitees to the event in a calendar entry. For instance, collaborative document recipient box 904 may be automatically populated with the names: User 1, User 2, User 3, User 4, User 5, User 6, and User 7.

Collaborative document description box 906 may include a text box for a description of the event. The description of the event in collaborative document description box 906 may include description of the event from a calendar entry. Collaborative document description box 906 may be automatically populated with any information from productivity management system 140 or be blank. Collaborative document description box 906 may allow for editing of information or inclusion of information such as text, images, drawings, spreadsheets, links to web pages, links to audio files, phone numbers, and/or the like. In some embodiments, collaborative document description box 906 automatically populates information regarding the event such as a meeting agenda, here the language "Event Agenda" taken from the event description fields of the calendar application.

Save button 908 may allow the creator to save the collaborative document. Cancel button 910 may allow the creator to exit the collaborative document without saving changes. Send button 912 may allow the creator to send the collaborative document to the recipients identified in collaborative document recipient box 904.

Figure 10:
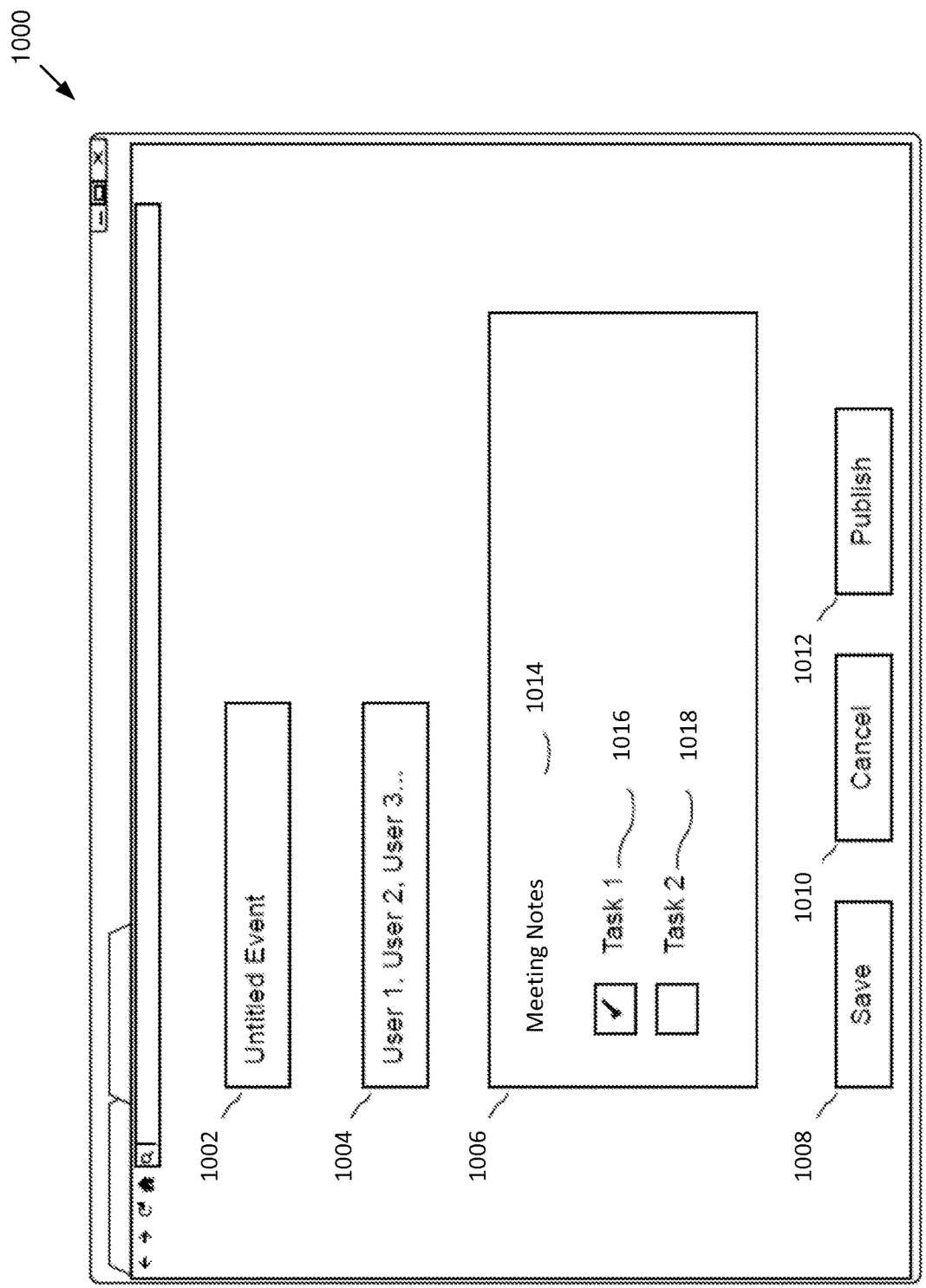
FIG. 10 shows an example collaborative document editing window of a content management system, according to some embodiments.

FIG. 10 shows an example collaborative document editing window 1000 of a content management system, according to some embodiments. Collaborative document editing window 1000 may include collaborative document title box 1002, collaborative document recipient box 1004, collaborative document description box 1006, save button 1008, cancel button 1010, and publication button 1012.

Collaborative document title box 1002, collaborative document recipient box 1004, save button 1008, and cancel button 1010 of FIG. 10 may be similar to document title box 902, collaborative document recipient box 904, save button 908, and cancel button 910 of FIG. 9. Collaborative document title box 1002 automatically includes text corresponding to the title of the event in a calendar entry. Collaborative document recipient box 1004 may include a text box for a proposed list of recipients for the collaborative document. Save button 1008 may allow the creator to save the collaborative document. Cancel button 1010 may allow the creator to exit the collaborative document without saving changes.

In this example, collaborative document description box 1006 has been filled out with content by a creator and/or other event attendees. More particularly, collaborative document description box 1006 may include annotation element 1014, first task element 1016, and second task element 1018. Annotation element 1014 may represent notes the creator and/or other event attendees have taken in the collaborative document. First task element 1016 may represent a task inserted by the creator and/or other event attendees. Similarly, second task element 1018 may represent a task inserted by the creator and/or other event attendees. Publication button 1012 may allow the collaborative document to be published.

In some embodiments, once publication button 1012 has been clicked, the collaborative document is stored as a read-only document that can no longer be written to and/or otherwise modified. For example, a read-only version of the collaborative document may be distributed to event attendees in response to clicking publication button 1012. Alternately, in some embodiments, the collaborative document may be available as a modifiable document to any number of attendees. In one example, the collaborative document editing window 1000 may allow collaborative note taking related to an event in a network-accessible calendar.

For clarity of explanation, in some instances the present technology may be presented as including individual functional blocks including functional blocks including devices, device components, steps or routines in a method embodied in software, or combinations of hardware and software.

In some embodiments the computer-readable storage devices, mediums, and memories may include a cable or wireless signal containing a bit stream and the like. However, when mentioned, non-transitory computer-readable storage media expressly exclude media such as energy, carrier signals, electromagnetic waves, and signals per se.

Methods according to the above-described examples may be implemented using computer-executable instructions that are stored or otherwise available from computer readable media. Such instructions may include, for example, instructions and data which cause or otherwise configure a general purpose computer, special purpose computer, or special purpose processing device to perform a certain function or group of functions. Portions of computer resources used may be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures may include hardware, firmware and/or software, and may take any of a variety of form factors. Typical examples of such form factors include laptops, smart phones, small form factor personal computers, personal digital assistants, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality may be distributed differently or performed in components other than those identified herein. Rather, the described features and steps are disclosed as examples of components of systems and methods within the scope of the appended claims.

What is claimed is:

1. A computer-implemented method comprising:
accessing a network-accessible calendar, maintained by a productivity management system via one or more application programming interfaces (APIs) maintained by the productivity management system;
identifying a calendar entry in the network-accessible calendar, the calendar entry comprising information associated therewith that includes at least an event and event attendees by gathering productivity information via the one or more APIs, the productivity information comprising information related to one or more calendar entries in the network-accessible calendar;
responsive to identifying the calendar entry, automatically creating for the event, via the one or more APIs, a collaborative document;
interfacing with an external computing system to obtain identities of event attendees, wherein each event attendee is associated with an account managed by the productivity management system;
suggesting that a subset of event attendees that have accepted an invite to the event receive access to the collaborative document;
responsive to receiving approval of the suggestion, storing the collaborative document in a shared location, accessible to the subset of event attendees, associated with the account managed by the productivity management system, based on the obtained identities;
prompting the productivity management system to modify the calendar entry to include an actionable link that provides access to the collaborative document in the shared location; and
providing access to the collaborative document responsive to an event attendee of the subset of event attendees selecting the actionable link;
in response to the event attendee selecting the actionable link, presenting the collaborative document to the event attendee, the collaborative document compatible with an external document editing application, without prompting the event attendee to separately open the external document editing application.

2. The computer-implemented method of claim 1, wherein the link is a Uniform Resource Locator (URL) to the collaborative document.

3. The computer-implemented method of claim 1, wherein the collaborative document is configured to be collaboratively edited by multiple digital devices at a particular time.

4. The computer-implemented method of claim 1, further comprising:
monitoring the collaborative document for changes; and
notifying at least some of the event attendees of the changes.

5. The computer-implemented method of claim 1, further comprising restricting write access to the collaborative document after an end time of the event.

6. The computer-implemented method of claim 1, further comprising modifying the collaborative document using a title of the calendar entry.

7. The computer-implemented method of claim 1, further comprising suggesting boilerplate content for the collaborative document based on the calendar entry.

8. The computer-implemented method of claim 7, further comprising receiving instructions to accept or to deny the boilerplate content.

9. The computer-implemented method of claim 1, further comprising providing, by a document editor application, to at least one of the event attendees a first prompt to invoke the collaborative document.

10. The computer-implemented method of claim 9, further comprising providing, by the document editor application, an ordered list of prompts wherein an order of the first prompt in the ordered list of prompts changes as a time and date of the event approaches.

11. A system comprising:
one or more processors; and
a memory storing instructions that, when executed by the one or more processors, cause the one or more processors to:
access a network-accessible calendar, maintained by a productivity management system via one or more application programming interfaces (APIs) maintained by the productivity management system;
identify a calendar entry in the network-accessible calendar by gathering productivity information via the one or more APIs, the productivity information comprising information related to one or more calendar entries in the network-accessible calendar, the calendar entry corresponding to an event and identifying user accounts for the network-accessible calendar, each of the user accounts associated with one or more event attendees, the calendar entry including information regarding the event;
responsive to identifying the calendar entry, automatically create for the event, via the one or more APIs, a collaborative document;
interface with an external computing system to obtain identities of event attendees, wherein each event attendee is associated with an account managed by the productivity management system;
suggest that a subset of event attendees that have accepted an invite to the event receive access to the collaborative document;
populate the collaborative document with the information regarding the event from the calendar entry the information regarding the event being provided through one or more APIs between the network-accessible calendar and the system;
responsive to receiving approval of the suggestion, store the collaborative document in a shared location, accessible to the subset of event attendees, associated with the account managed by the productivity management system, based on the obtained identities;
prompt the productivity management system to modify the calendar entry to include an actionable link that provides access to the collaborative document in the shared location; and
provide access to the collaborative document responsive to an event attendee of the subset of event attendees selecting the actionable link;
in response to the event attendee selecting the actionable link, presenting the collaborative document to the event attendee, the collaborative document compatible with an external document editing application, without prompting the event attendee to separately open the external document editing application.

12. The system of claim 11, wherein the link is a Uniform Resource Locator (URL) to the collaborative document.

13. The system of claim 11, wherein the collaborative document is configured to be collaboratively edited by multiple digital devices at a particular time.

14. The system of claim 11, wherein the instructions further cause the one or more processors to:
monitor the collaborative document for changes; and
notify at least some of the event attendees of the changes.

15. The system of claim 11, wherein the instructions further cause the one or more processors to restrict write access to the collaborative document after an end time of the event.

16. The system of claim 11, wherein the instructions further cause the one or more processors to modify the collaborative document using a title of the calendar entry.

17. The system of claim 11, wherein the instructions further cause the one or more processors to store the collaborative document in a network-accessible content management system.

18. The system of claim 11, wherein the instructions further cause the one or more processors to suggest boilerplate content for the collaborative document based on the calendar entry.

19. The system of claim 18, wherein the instructions further cause the one or more processors to receive instructions to accept or to deny the boilerplate content.

20. The system of claim 11, wherein the instructions further cause the one or more processors to: provide, by a document editor application, to at least one of the event attendees a first prompt to invoke the collaborative document.

21. The system of claim 20, wherein the instructions further cause the one or more processors to: provide, by the document editor application, an ordered list of prompts wherein an order of the first prompt in the ordered list of prompts changes as a time and date of the event approaches.

22. A non-transitory computer readable medium comprising executable instructions, the instructions executable by one or more processors to perform a method, the method comprising:
accessing a network-accessible calendar, maintained by a productivity management system via one or more application programming interfaces (APIs) maintained by the productivity management system;
identifying a calendar entry in the network-accessible calendar, the calendar entry comprising information associated therewith that includes at least an event and event attendees by gathering productivity information via the one or more APIs, the productivity information comprising information related to one or more calendar entries in the network-accessible calendar;
responsive to identifying the calendar entry, automatically creating for the event, via the one or more APIs, a collaborative document without actions of multiple users associated with an account managed by the productivity management system;
interfacing with an external computing system to obtain identities of event attendees, wherein each event attendee is associated with an account managed by the productivity management system;
suggesting that a subset of event attendees that have accepted an invite to the event receive access to the collaborative document;
responsive to receiving approval of the suggestion, storing the collaborative document in a shared location, accessible to the subset of event attendees, associated with the account managed by the productivity management system, based on the obtained identities;
prompting the productivity management system to modify the calendar entry to include an actionable link that provides access to the collaborative document in the shared location; and
providing access to the collaborative document responsive to an event attendee of the subset of event attendees selecting the actionable link;
in response to the event attendee selecting the actionable link, presenting the collaborative document to the event attendee, the collaborative document compatible with an external document editing application, without prompting the event attendee to separately open the external document editing application.

23. The computer-implemented method of claim 1, wherein interfacing with the external computing system to obtain the identities of the event attendees, wherein each event attendee is associated with the account managed by the productivity management system comprises:
identifying the identities of the event attendees based on a common domain associated with each event attendee.

24. The computer-implemented method of claim 1, wherein interfacing with the external computing system to obtain the identities of the event attendees, wherein each event attendee is associated with the account managed by the productivity management system comprises:
identifying the identities of the event attendees based on each event attendee being a member of a group to which a creator of the calendar entry is a member.

25. The computer-implemented method of claim 1, wherein interfacing with the external computing system to obtain the identities of the event attendees, wherein each event attendee is associated with the account managed by the productivity management system comprises:
identifying the identities of the event attendees based on prior participation in past events involving similar subject matter to the calendar entry.

* * * * *